Sept. 2, 1952 D. KRAMER 2,608,919
MEANS USED IN CONJUNCTION WITH A MOTION PICTURE CAMERA
FOR THE PHOTOGRAPHIC RECORDING OF A DATE ON A FILM
Filed Nov. 25, 1949

INVENTOR.
Daniel Kramer
BY Lawler + Lawler
Attys.

Patented Sept. 2, 1952

2,608,919

UNITED STATES PATENT OFFICE 2,608,919

MEANS USED IN CONJUNCTION WITH A MOTION PICTURE CAMERA FOR THE PHOTOGRAPHIC RECORDING OF A DATE ON A FILM

Daniel Kramer, Willowick, Ohio

Application November 25, 1949, Serial No. 129,464

2 Claims. (Cl. 95—1.1)

This invention relates to means used in conjunction with a motion picture camera and the like, for the photographic recording on the film of the date when the picture was taken.

The means carrying the date indicia and the focusing means is removably mounted as a unit in the tube of the motion picture camera in which the lens or combination of lenses is mounted.

The image of the date is "exposed" and recorded on the film.

My invention is herein illustrated and will be described in connection with the recording of a date on the film. In recording the date on the film, it is essential that a proper focusing means be provided so that when the indicia is exposed to the light a proper photographic picture will result.

For this purpose, the invention provides a means through which the light rays pass, and is provided with means for adjusting the aforesaid means with respect to the focusing means in the camera, when mounted in the camera tube of the picture taking camera.

The device carrying the indicia and focusing means is removably mounted as a unit in the camera tube. The camera tube is usually supplied with a screw-thread which is utilized in removably mounting the device therein.

Details of construction and arrangement of the parts will be apparent as the description proceeds, reference now being had to the accompanying drawing forming a part of this application, and wherein like reference numerals indicate like parts.

Figure 4:
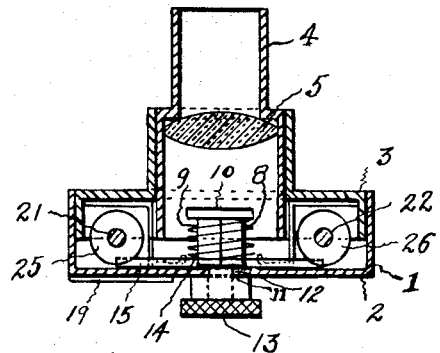
Figure 4 is a sectional view illustrating the optical system in the casing, the pressure fingers, a disk carrying indicia, the disk mounted on the headed bolt, and the helical spring on the bolt.
Figure 5:
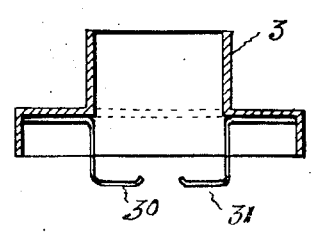
Figure 5 is a sectional view showing the pressure fingers for the film carrying the figures 1, 2, 3 etc.

The reference character 1 refers to the casing generally which comprises three sections. The front or face section 2 fits with a snug fit over the intermediate section 3 and the rear section 4 in which the optical system 5 is mounted, telescopes into the intermediate section, see sectional view Figure 4.

The disk 6 bearing the abbreviation of the respective months, January, February, March, etc. is provided with a square central aperture 7 and is mounted on the bolt 8 having a square portion 9, an expanded head 10, a cylindrical portion 11 that passes through a smooth bore 12 in the face of the casing and is rotatably mounted therein by means of a knob 13 fast on the bolt. A helical spring 14 is mounted on the bolt and is positioned between the back surface of the disk and the expanded head on the bolt.

The disk 15 carrying the abbreviation of the respective years, 50, 51, 52, 53 etc. is identical in construction and operation with that of the disk 6 save the indicia, and it is thought that the description and operation of the disk 6 will suffice for both.

Figure 2:
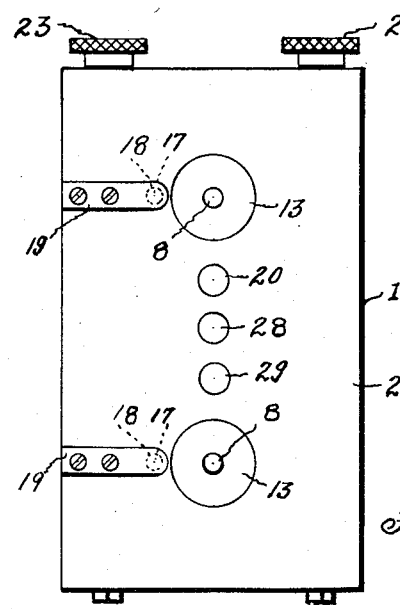
Figure 2 is a front elevational view of the device, illustrating the apertures in the front section through which the light rays may pass to the indicia carried by the disks and film.

In the disk there is provided a plurality of indentations 16 adapted to seat the ball 17 which is held captive in the through hole 18 in the front section by a flat spring 19 connected to the outer face thereof, see position of springs in Figure 2.

When the disk is turned manually to bring the selected indicia into registry with the aperture 20 in the front plate, the disk is forced back on the bolt by the cooperation of the flat spring and the ball in freeing the ball out of the indentation. When the indicia is properly aligned in the aperture, the ball engages in an indentation and locks the disk in position through the cooperation of the flat spring. The helical spring on the bolt forces the disk forward on the bolt to maintain the lock and also to assist in making the casing light-tight.

In the casing there is provided two longitudinal extending spindles 21 and 22, each supplied on its upper end with a knob fast thereon as at 23 and 24 to turn same. On each spindle there is fixedly mounted a spool member as at 25 and 26 on which the light passing material 27 bearing the numbers 1 to 31 is rollable. These spindles may be turned clockwise or counterclockwise to bring the selected number into registry with the opening 28 in the face plate of the casing.

The aperture 29 in the front plate is provided to permit the reading of the abbreviated year on or in the disk 15 when the same is brought into registry therewith.

The pressure fingers 30 and 31 are provided to hold the light transmitting medium 27 in slight frictional contact with the inner surface of the face plate of the section 2. It will be noted that the light transmitting medium 27 is positioned between the disk 6 and the disk 15 and extends transversely across the casing and in the interior thereof and is manually wound on and off the spools to bring the selected date into registry with the aperture 28 in the face plate. The fingers also assist to make the casing light-tight.

The interior of the casing is given a coat of light absorbing medium such as a dull black paint or a lacquer.

Figure 1:
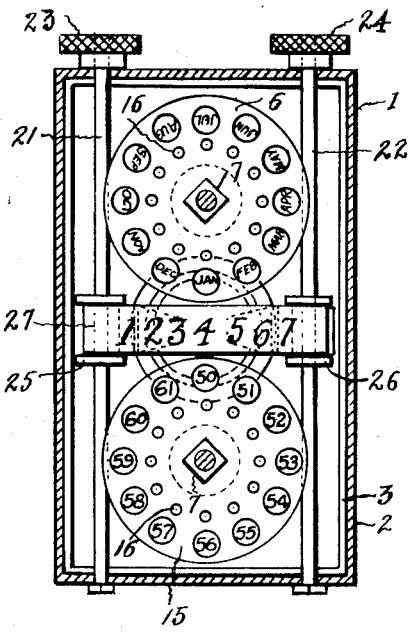
Figure 1 is a front elevational view of the device, the front plate removed therefrom to show the interior of the casing.
Figure 3:
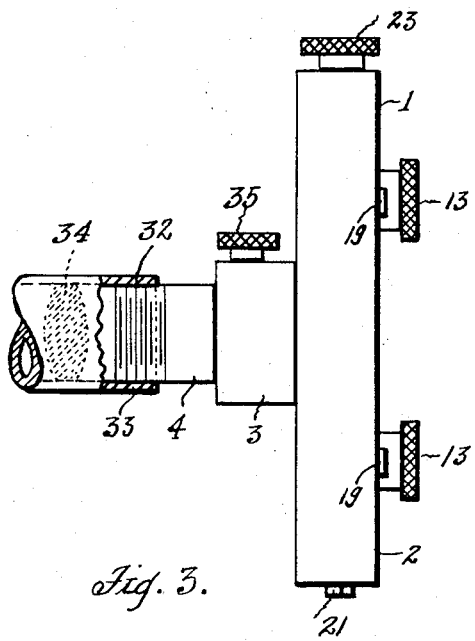
Figure 3 is a side view of the device mounted in the tube of a picture taking camera. The tube is shown fragmentary, and the optical system is shown in the tube.

The end portion of the section 4 of the casing is provided with a screw-thread 32 adapted to be screwed into threaded tube 33 of the picture taking camera. The picture taking camera tube is shown fragmentarily, and the camera lens is illustrated therein as at 34, see Figure 3.

The assembled sections 2 and 3 may be adjusted longitudinally and rotatively on the section 4 by releasing the thumb screw 35, and after adjustment tightening the same, for the purpose of focusing.

It is believed that operation of the device will be clear from the foregoing description given in connection with the respective parts, and that the construction shown provides a compact and economical device for the purpose of accomplishing the objects sought.

I am aware that my invention may be embodied in other forms without departing from the spirit or essential attributes thereof, and I therefore desire the present embodiment to be considered in all respects as illustrative and not restrictive, reference being had to the appended claims rather than to the foregoing description to indicate the scope of the invention.

What is claimed is:

1. A device of the class described, comprising, in combination a casing comprising a plurality of sections, one of the sections having a plurality of light admitting apertures therein, the aforementioned section snugly fitting over an intermediate section and forming with the first mentioned section a light-tight compartment, a rear section telescoped into the intermediate section, a lens system incorporated in the rear section, manually rotatable disk members having transparent and opaque portions which define indicia in the compartment, a manually transversely movable member of narrow strip configuration having transparent and opaque portions which define indicia positioned between the disk members in the compartment, a bolt for each disk member formed with a square portion, a cylindrical portion extending from the square portion and forming a shoulder therewith, a head on the square portion, a disk having a square hole therein slidably mounted on the square portion, a helical spring interposed between the head on the bolt and the back surface of the disk, the cylindrical portion of the bolt journalled in the casing, a knob fast on the cylindrical portion adapted to turn the bolt with the disk thereon, the helical spring on the bolt adapted to normally urge the disk into slight frictional contact with the inner surface of the casing and retain it in selected position.

2. A device of the class described comprising, a casing having a plurality of light admitting apertures therein, in the interior of the casing, rotatably mounted disks having transparent and opaque portions which define indicia, a transversely movable narrow strip member having transparent and opaque portions which define indicia, means for moving the aforesaid narrow strip back and forth to position the indicia thereon to register with a light admitting aperture in the casing, said means comprising spaced spindles and spools, the narrow strip member wound on the spools, a knob to separately rotate each disk to position the indicia carried thereby to register with respective light admitting apertures in the casing, a lens mounted in the casing adapted to receive light rays and images of the indicia and focus same upon the focusing lens system in the picture taking camera to photograph the indicia on the sensitized film therein and pressure fingers in the interior of the casing to hold the narrow strip member having transparent and opaque portions which define indicia in slight frictional contact with the inner surface of the casing thereby assisting to make the casing light-tight.

DANIEL KRAMER.

REFERENCES CITED

The following references are of record in the file of this patent:

UNITED STATES PATENTS

| Number | Name | Date |
| --- | --- | --- |
| 518,372 | Mackenstein | Apr. 17, 1894 |
| 1,117,159 | Berst | Nov. 17, 1914 |
| 2,226,364 | Anthony | Dec. 24, 1940 |